(12) United States Patent
Eremenko et al.

(10) Patent No.: US 10,042,402 B2
(45) Date of Patent: Aug. 7, 2018

(54) SYSTEMS AND METHODS FOR THERMAL MANAGEMENT OF A CHASSIS-COUPLED MODULAR MOBILE ELECTRONIC DEVICE

(71) Applicant: Google Inc., Mountain View, CA (US)

(72) Inventors: Paul Eremenko, Mountain View, CA (US); David Fishman, Mountain View, CA (US); Seth Newburg, Mountain View, CA (US); Ara Knaian, Mountain View, CA (US); Marisa Bober, Mountain View, CA (US)

(73) Assignee: Google LLC, Mountain View, CA (US)

( * ) Notice: Subject to any disclaimer, the term of this patent is extended or adjusted under 35 U.S.C. 154(b) by 470 days.

(21) Appl. No.: 14/680,955

(22) Filed: Apr. 7, 2015

(65) Prior Publication Data

US 2015/0286259 A1 Oct. 8, 2015

Related U.S. Application Data

(60) Provisional application No. 61/976,215, filed on Apr. 7, 2014.

(51) Int. Cl.
*G06F 1/20* (2006.01)

(52) U.S. Cl.
CPC ............. *G06F 1/206* (2013.01); *G06F 1/203* (2013.01)

(58) Field of Classification Search
CPC ................................ G06F 1/206; G06F 1/203
USPC ......................................................... 700/300
See application file for complete search history.

(56) References Cited

U.S. PATENT DOCUMENTS

| | | | |
|---|---|---|---|
| 4,658,333 A | 4/1987 | Grimes | |
| 4,856,088 A | 8/1989 | Oliwa et al. | |
| 4,904,549 A | 2/1990 | Goodwin et al. | |
| 4,974,317 A | 12/1990 | Noe et al. | |
| 5,475,563 A * | 12/1995 | Donahoe | G06F 1/203 361/679.4 |
| 5,895,230 A | 4/1999 | Bartley | |
| 5,983,303 A | 11/1999 | Sheafor et al. | |
| 6,388,882 B1 * | 5/2002 | Hoover | F28D 15/0266 165/104.33 |
| 6,862,173 B1 | 3/2005 | Konshak et al. | |
| 6,942,021 B2 * | 9/2005 | Makino | F28D 15/043 165/104.26 |

(Continued)

FOREIGN PATENT DOCUMENTS

WO 2013120723 A1 8/2013

*Primary Examiner* — Kenneth M Lo
*Assistant Examiner* — Michael J. Huntley
(74) *Attorney, Agent, or Firm* — Dorrity & Manning, P.A.

(57) ABSTRACT

Systems and methods for thermal management of a mobile electronic device. During operation of a modular mobile electronic device that is coupled to one or more modules via respective module interfaces of the electronic device, a thermal controller of the electronic device is used to update at least one system thermal goal based on a change for a module thermal model for at least one module coupled to the electronic device. A determination is made as to whether the updated at least one system thermal goal is satisfied based on thermal data provided by a plurality of thermal sensors arranged at locations associated with the electronic device. Responsive to a determination that the updated at least one system thermal goal is not satisfied, the thermal controller controls heat transfer to satisfy the updated at least one thermal goal.

20 Claims, 12 Drawing Sheets

(56) References Cited

U.S. PATENT DOCUMENTS

| | | | |
|---|---|---|---|
| 7,458,815 B2 | 12/2008 | Fallah-Adl et al. | |
| 7,500,078 B2* | 3/2009 | Rangarajan | G06F 1/206 |
| | | | 711/165 |
| 7,509,094 B2 | 3/2009 | Moran et al. | |
| 7,618,260 B2 | 11/2009 | Daniel et al. | |
| 7,760,496 B2* | 7/2010 | Tsukazawa | G06F 1/203 |
| | | | 361/679.31 |
| 7,953,455 B2 | 5/2011 | Moran et al. | |
| 8,145,926 B2* | 3/2012 | Park | G06F 1/203 |
| | | | 165/287 |
| 8,154,244 B1 | 4/2012 | Gorham et al. | |
| 8,180,395 B2 | 5/2012 | Moran et al. | |
| 8,249,656 B2 | 8/2012 | Sherman et al. | |
| 8,284,205 B2* | 10/2012 | Miller | G06F 1/3203 |
| | | | 345/501 |
| 8,285,342 B2 | 10/2012 | Moran et al. | |
| 8,306,772 B2* | 11/2012 | Cox | G01K 7/42 |
| | | | 702/132 |
| 8,405,975 B2* | 3/2013 | Helberg | G06F 1/1632 |
| | | | 165/104.33 |
| 8,509,848 B1 | 8/2013 | Cole | |
| 8,798,806 B2* | 8/2014 | Lev | G05D 23/19 |
| | | | 236/49.3 |
| 8,893,513 B2* | 11/2014 | June | F25B 21/00 |
| | | | 62/3.2 |
| 8,942,857 B2* | 1/2015 | Anderson | G06F 1/206 |
| | | | 700/299 |
| 9,086,862 B2* | 7/2015 | Hsiao | G06F 1/206 |
| 9,257,157 B2* | 2/2016 | Chu | G11C 7/04 |
| 9,639,126 B2* | 5/2017 | Senyk | G06F 1/203 |
| 2003/0118006 A1 | 6/2003 | Yang et al. | |
| 2004/0212941 A1 | 10/2004 | Haas et al. | |
| 2005/0049729 A1* | 3/2005 | Culbert | G06F 1/206 |
| | | | 700/50 |
| 2005/0190124 A1 | 9/2005 | Manabe | |
| 2005/0205241 A1* | 9/2005 | Goodson | F04B 19/006 |
| | | | 165/80.4 |
| 2006/0041729 A1* | 2/2006 | Rider | G06F 12/02 |
| | | | 711/165 |
| 2007/0094436 A1* | 4/2007 | Keown, Jr. | G06F 1/206 |
| | | | 710/307 |
| 2007/0099593 A1 | 5/2007 | Thome et al. | |
| 2007/0211548 A1* | 9/2007 | Jain | G11C 5/04 |
| | | | 365/211 |
| 2008/0028237 A1 | 1/2008 | Knight | |
| 2008/0068804 A1* | 3/2008 | Liu | G06F 1/203 |
| | | | 361/709 |
| 2008/0168282 A1 | 7/2008 | Brundridge | |
| 2008/0197825 A1 | 8/2008 | Siri | |
| 2008/0224769 A1 | 9/2008 | Markowski et al. | |
| 2009/0124288 A1 | 5/2009 | Song et al. | |
| 2009/0167245 A1 | 7/2009 | Nguyen | |
| 2009/0280865 A1 | 11/2009 | Danis et al. | |
| 2010/0073202 A1 | 3/2010 | Mazed | |
| 2010/0220432 A1 | 9/2010 | Wise et al. | |
| 2010/0302028 A1 | 12/2010 | Desai et al. | |
| 2010/0323238 A1 | 12/2010 | Takahashi et al. | |
| 2011/0055596 A1* | 3/2011 | Wyatt | G06F 1/206 |
| | | | 713/300 |
| 2011/0157815 A1 | 6/2011 | Lin | |
| 2011/0179405 A1 | 7/2011 | Dicks et al. | |
| 2011/0264944 A1 | 10/2011 | Newman | |
| 2011/0301777 A1* | 12/2011 | Cox | G06F 1/206 |
| | | | 700/299 |
| 2011/0301778 A1* | 12/2011 | Liang | G05D 23/1932 |
| | | | 700/299 |
| 2012/0050000 A1* | 3/2012 | Melvin, Jr. | G05B 23/0289 |
| | | | 340/3.1 |
| 2012/0179441 A1* | 7/2012 | Anderson | G06F 1/206 |
| | | | 703/6 |
| 2012/0293934 A1 | 11/2012 | Boduch et al. | |
| 2013/0008707 A1 | 1/2013 | Kim | |
| 2013/0026572 A1 | 1/2013 | Kawa et al. | |
| 2013/0103212 A1 | 4/2013 | Andiappan | |
| 2013/0155600 A1 | 6/2013 | Ross et al. | |
| 2014/0009980 A1 | 1/2014 | Divan et al. | |
| 2014/0249690 A1* | 9/2014 | Park | G06F 1/206 |
| | | | 700/300 |
| 2014/0355206 A1* | 12/2014 | Sullivan | G06F 1/20 |
| | | | 361/679.54 |
| 2015/0288053 A1* | 10/2015 | Saxe | H01Q 1/243 |
| | | | 343/702 |

\* cited by examiner heat routed toward right side,
away from left side

SYSTEMS AND METHODS FOR THERMAL MANAGEMENT OF A CHASSIS-COUPLED MODULAR MOBILE ELECTRONIC DEVICE

CROSS-REFERENCE TO RELATED APPLICATIONS

This application claims the benefit of U.S. Provisional Application Ser. No. 61/976,215, filed on 7 Apr. 2014, which is incorporated in its entirety by this reference

TECHNICAL FIELD

This invention relates generally to the mobile electronics field, and more specifically to new and useful systems and methods for thermal management of a chassis-coupled modular mobile electronic device in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Modular mobile electronic devices may serve to meet user needs and preferences. Like all mobile electronic devices, modular mobile electronic devices must effectively manage heat production and transfer or risk device damage or unreliability. Thermal management is especially difficult for modular mobile electronic devices because both heat production and heat transfer depend greatly on the configuration of the modular mobile electronic devices. Thus, there is a need in mobile electronics field to create systems and methods for thermal management of a chassis-coupled modular mobile electronic device. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Thermal Management

Figure 1:
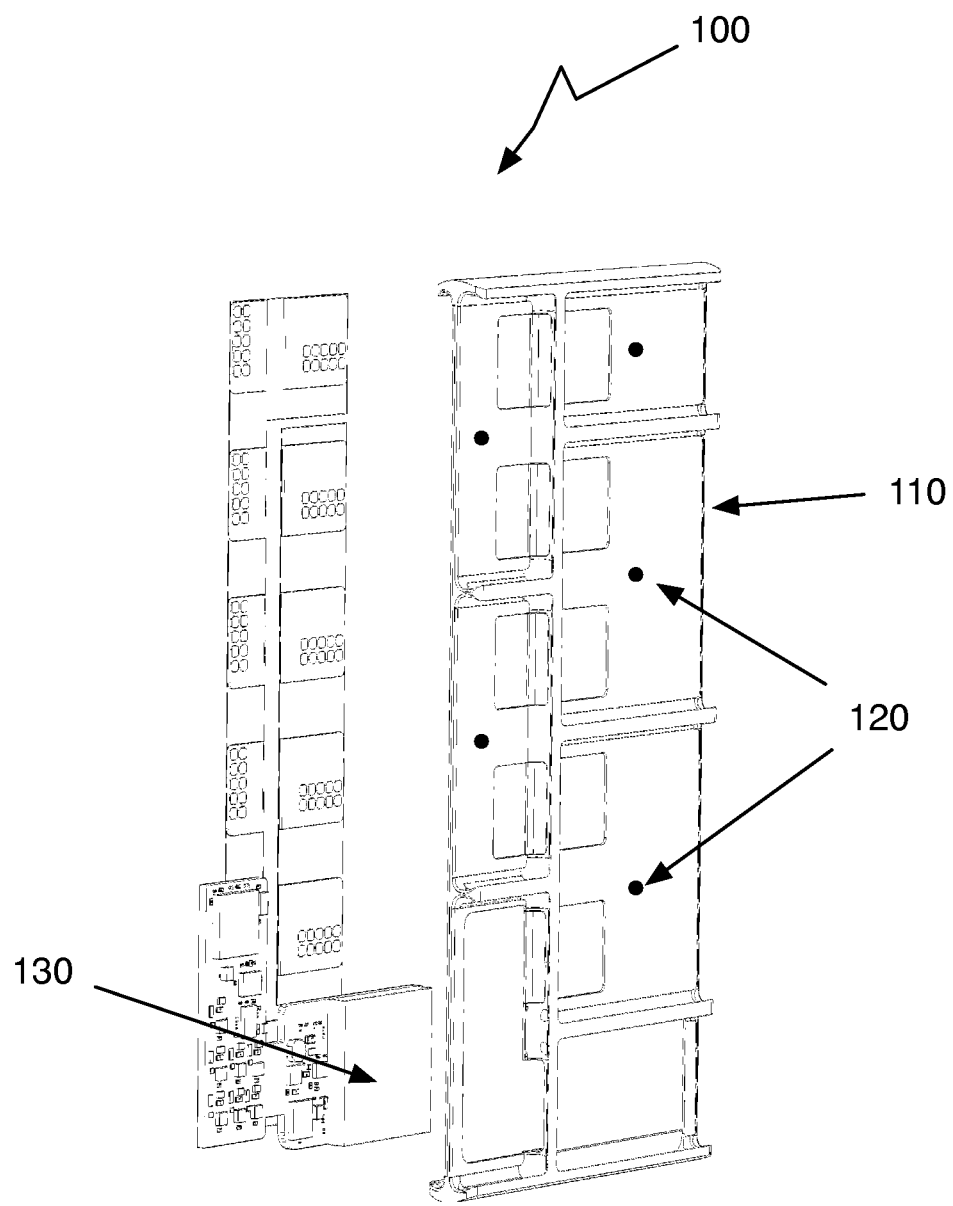
FIG. 1 is a model view of a system of a preferred embodiment.

As shown in FIG. 1, a system 100 for thermal management of a chassis-coupled modular mobile electronic device (hereafter CCMMED) includes a chassis 110, thermal sensors 120, and a thermal controller 130. The system 100 preferably operates as part of a CCMMED (e.g., 160 of FIG. 2) having a modular electronic device enablement system (hereafter MEDES) (e.g., 170 of FIG. 2) coupled to a plurality of modules (e.g., 150 of FIG. 2) via respective module interfaces (e.g., 140 of FIG. 2). The system 100 more preferably operates as part of a CCMMED such as the CCMMED of U.S. Provisional Application No. 61/976,195, which is incorporated in its entirety by this reference. The MEDES 160 of the CCMMED 170 is preferably substantially similar to the system of U.S. Provisional Application No. 61/976,173, which is incorporated in its entirety by this reference. The system 100 may additionally or alternatively operate on and/or as part of any suitable CCMMED or similar system.

Figure 2:
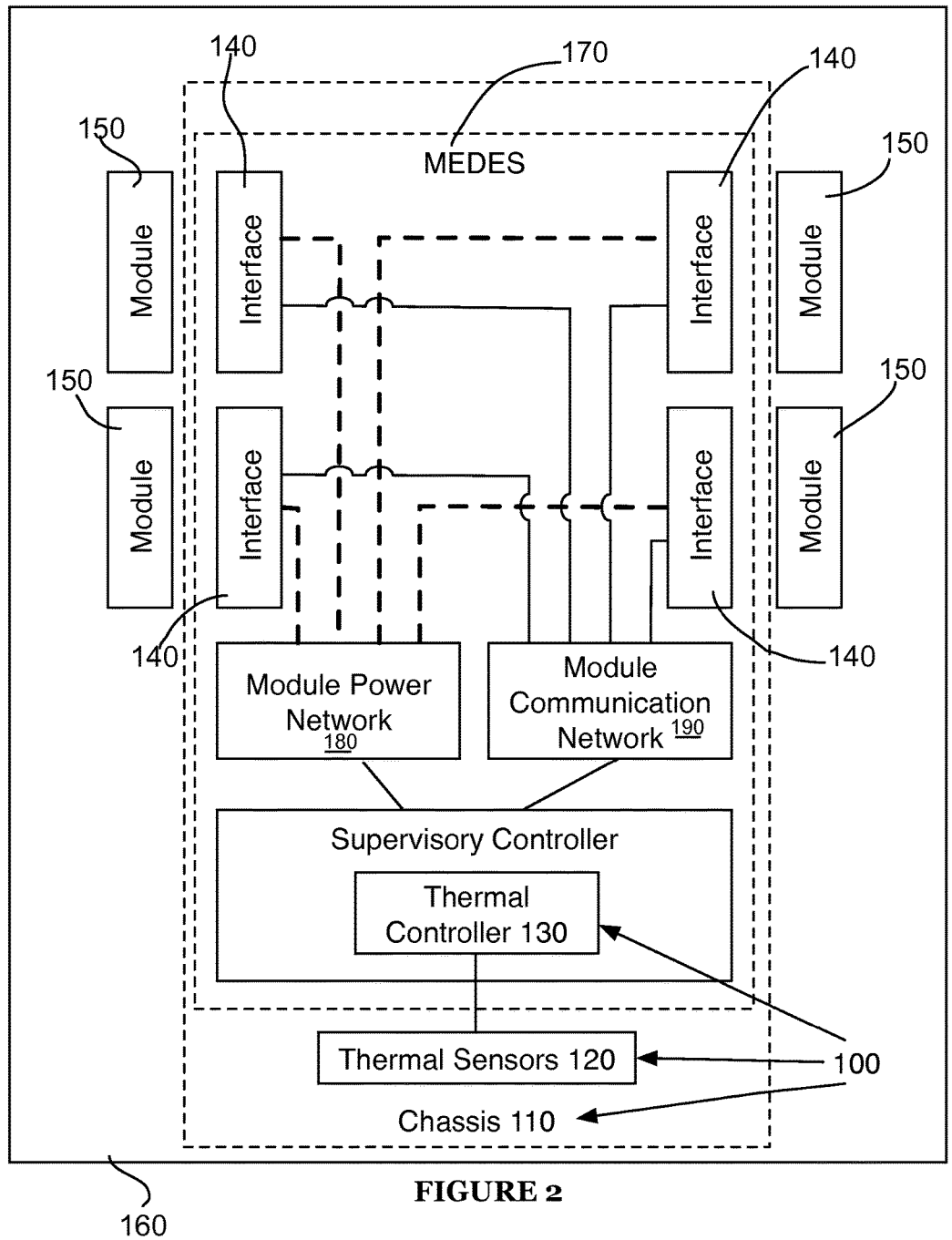
FIG. 2 is a diagram view of a chassis-coupled modular electronic device based on a system of a preferred embodiment.

The system 100 functions to provide thermal management for a CCMMED (e.g., the CCMMED 160 of FIG. 2). Thermal management is of importance for all mobile electronic devices: mobile electronic devices must effectively deal with the heat that they produce in order to ensure reliability and prevent device failure. Thermal management is even more important for modular mobile electronic devices because heat production and heat dissipation depend greatly on the configuration of the modular mobile electronic devices. This dependence means that thermal management systems for modular mobile electronic devices should be effective at dissipating heat and controlling heat production for a wide variety of modular mobile electronic device configurations.

Figure 3A:
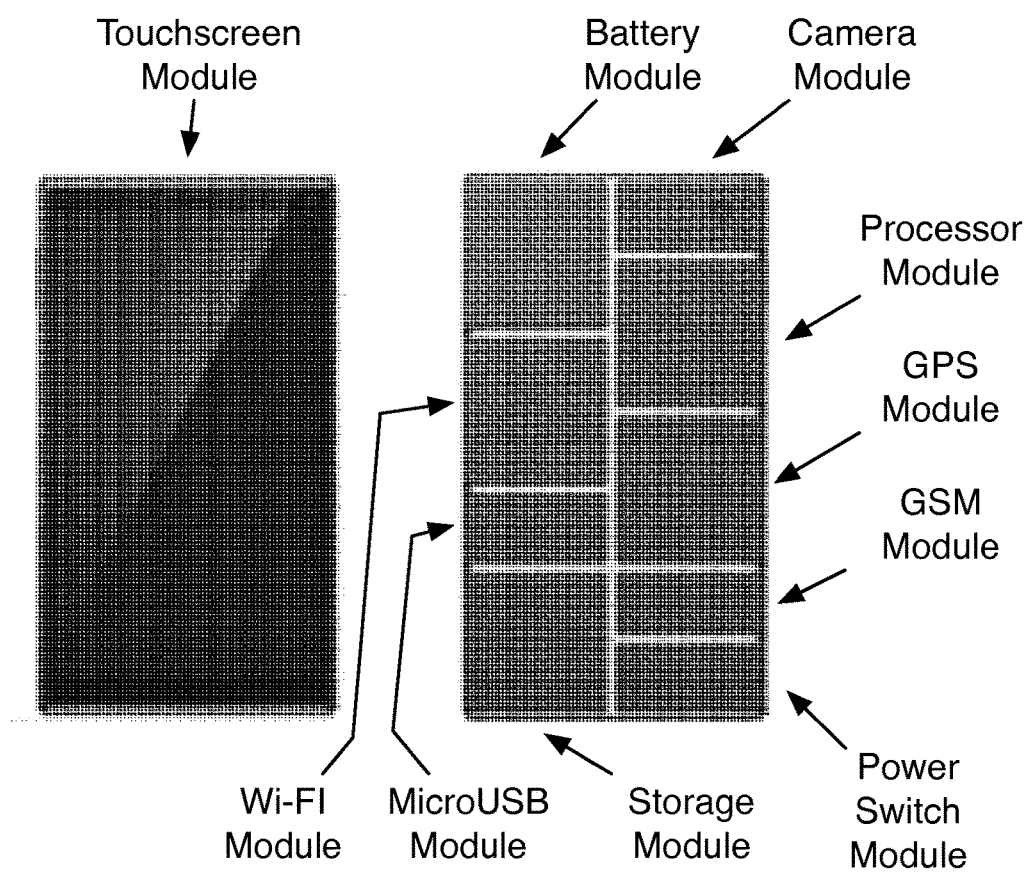
FIGS. 3A and 3B are image views of example chassis-coupled modular electronic devices based on a system of a preferred embodiment.

As shown in FIG. 2, the CCMMED 160 preferably includes a MEDES 170, a plurality of modules 150, and the system 100. The MEDES preferably includes a module communication network 180, a module power network 190, and a plurality of module interfaces 140. The CCMMED is preferably created and/or modified through the use of user-removable modules. Modules preferably removably connect to the CCMMED through the module interfaces. Modules preferably communicate with each other using the module communication network and receive power from or send power to each other using the module power network. When multiple modules are connected to the modular communication network and the modular power network, the modules in confederation are preferably enabled to serve as a mobile electronic device in a configuration instance. The mobile electronic device created by such a confederation is preferably characterized by the confederated modules as well as the parameters of confederation, which are preferably determined by the module communication network and the confederated modules. As shown in FIG. 3A, a CCMMED configured to serve as a smartphone is an example of a possible mobile electronic device created by module confederation. Other examples of possible modular mobile electronic devices include those configured to serve as tablets, laptops, media players, cameras, measurement devices, gaming systems, vehicular computing devices, set-top boxes, and televisions.

Figure 3B:
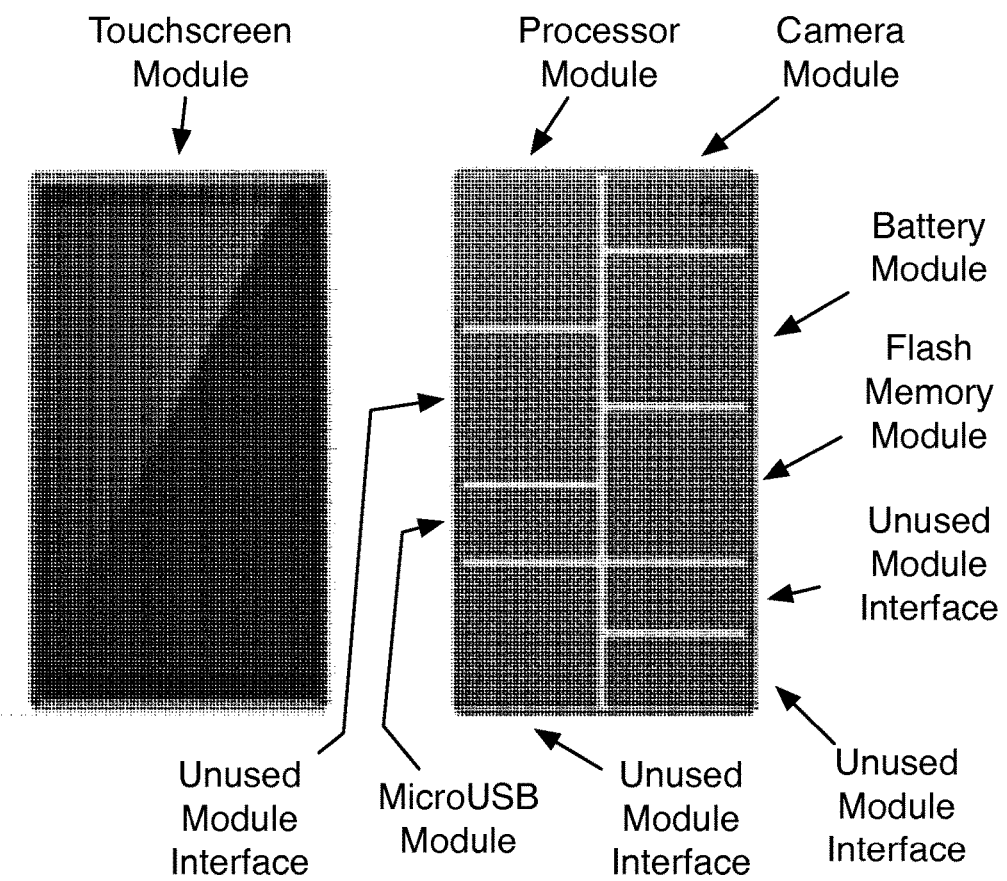

Modules connected to the CCMMED are preferably user-removable and replaceable, enabling users to create mobile electronic devices with highly varied form and functionality. For example, as shown in FIG. 3B, a user may connect a camera module, a flash memory module, a processor module, a battery module, and a touchscreen LCD module to create a small and lightweight camera. The user could later add a cell-phone radio module and a microphone/speaker module to create a camera phone. Modules preferably follow an open and free standard, enabling almost anyone to be a module developer.

The flexibility afforded by module confederation preferably allows for a number of favorable outcomes. Users can purchase only the modules necessary for their needs, allowing for reductions in cost. Users can also choose to replace modules or add additional modules later. In combination, these two outcomes may help increase accessibility to mobile electronic devices (and in many cases, the internet) throughout the world, especially for people for whom a smartphone or a PC is not currently a good value proposition. For example, a user may buy a CCMMED with a basic set of modules, configured as a basic phone, at a low price point, and transition to a more advanced phone by adding modules later on. These two outcomes may also help slow the creation of electronic waste by allowing mobile electronic devices to be upgraded or modified rather than replaced. Further, because the CCMMED is compatible with modules of highly varied form and function, and because modules are preferably based on an open standard, module confederation may allow small or specialized companies to make modules playing to their strengths without designing a full mobile electronic device.

The system 100 is preferably compatible with a large range of module types. Modules may serve any function or purpose as long as they are capable of communicating over the module communication network. Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, and haptic input modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, and USB connector modules. Examples of display modules include touchscreen LCD modules, non-touch graphical display modules, and e-ink display modules. Examples of power modules include battery modules, solar panel modules, and battery charging modules. The variety of modules preferably serve to provide various options and combinations of inputs, outputs, data storage, data processing, communication, power, and other suitable aspects of a computing device. Note that these example module types are in no way exhaustive or exclusive; i.e., modules may incorporate functionality from many of these example types or from none at all, and modules may additionally or alternatively incorporate suitable functionality not herein described.

The chassis 110 functions to provide structural support to the CCMMED. More specifically, the chassis no preferably mechanically couples to the modules, providing structural support to the modules when coupled to the chassis 110. The chassis 110 may additionally enable the connection of the modules to the module communication network and/or the module power network. The chassis 110 preferably at least partially encloses the MEDES of the CCMMED, and more preferably encloses all of the MEDES except for the module interfaces of the MEDES, but may additionally or alternatively couple to the MEDES in any suitable manner. The chassis 110 is preferably of a rigid material, but may additionally or alternatively have any material composition.

Figure 4:
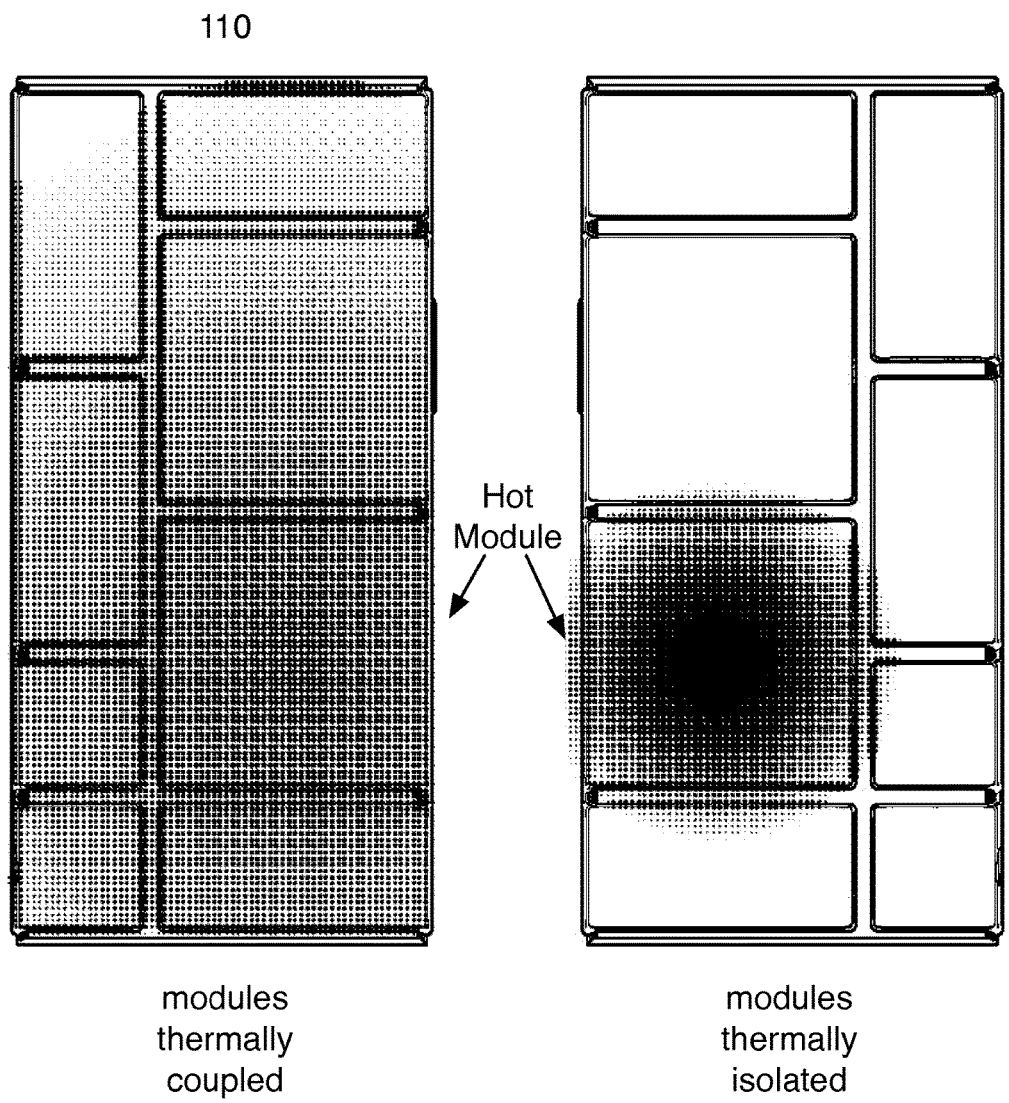
FIG. 4 is a thermal view of a system of a preferred embodiment.

As shown in FIG. 4, the chassis 110 preferably functions to thermally couple to the modules and may additionally or alternatively function to thermally couple modules to each other. The chassis 110 is preferably of a thermally conductive material (e.g. metal), enabling heat produced by modules to diffuse across the chassis 110.

The chassis 110 preferably enables thermal coupling through conductive heat transfer enabled by mechanical contact, but may additionally or alternatively thermally couple to modules through radiative heat transfer, convective heat transfer, or any other type of heat transfer. Allowing heat transfer preferably reduces the presence and/or magnitude of heat concentration in modules coupled to the system 100, which may prevent damage to and/or improve reliability of the CCMMED.

The chassis 110 preferably enables thermal coupling of the modules through conductive heat transfer through the solid bulk of the chassis 110, but may additionally or alternatively enable thermal coupling through any other heat transfer means. For example, the chassis no may contain fluid-filled channels, allowing heat transfer through the fluid. As another example, the chassis 110 may contain heat pipes, allowing heat transfer based on both thermal conduction and phase transition. If the chassis 110 includes heat pipes, the heat pipes may include variable conductance heat pipes and/or diode heat pipes, allowing for variable and/or directional heat transfer through the chassis 110. The chassis 110 may additionally or alternatively include any type of active heat transfer device, including thermoelectric devices and/or any other type of heat pump.

Figure 5:
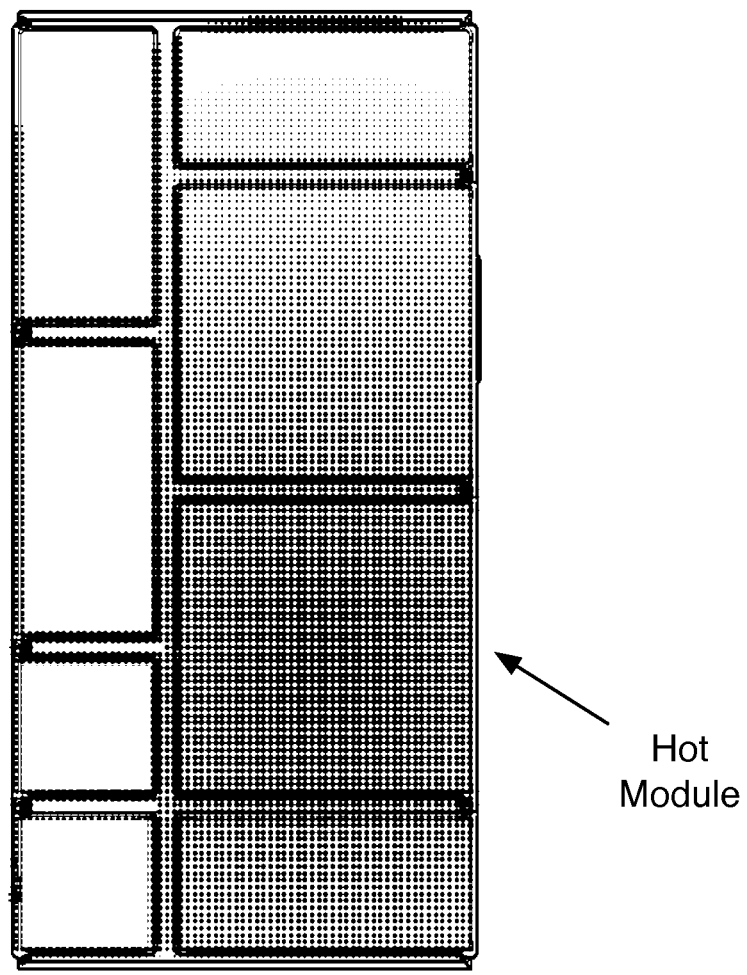
FIG. 5 is an example view of thermal routing of an active heat routing system of a system of a preferred embodiment.
Figure 6:
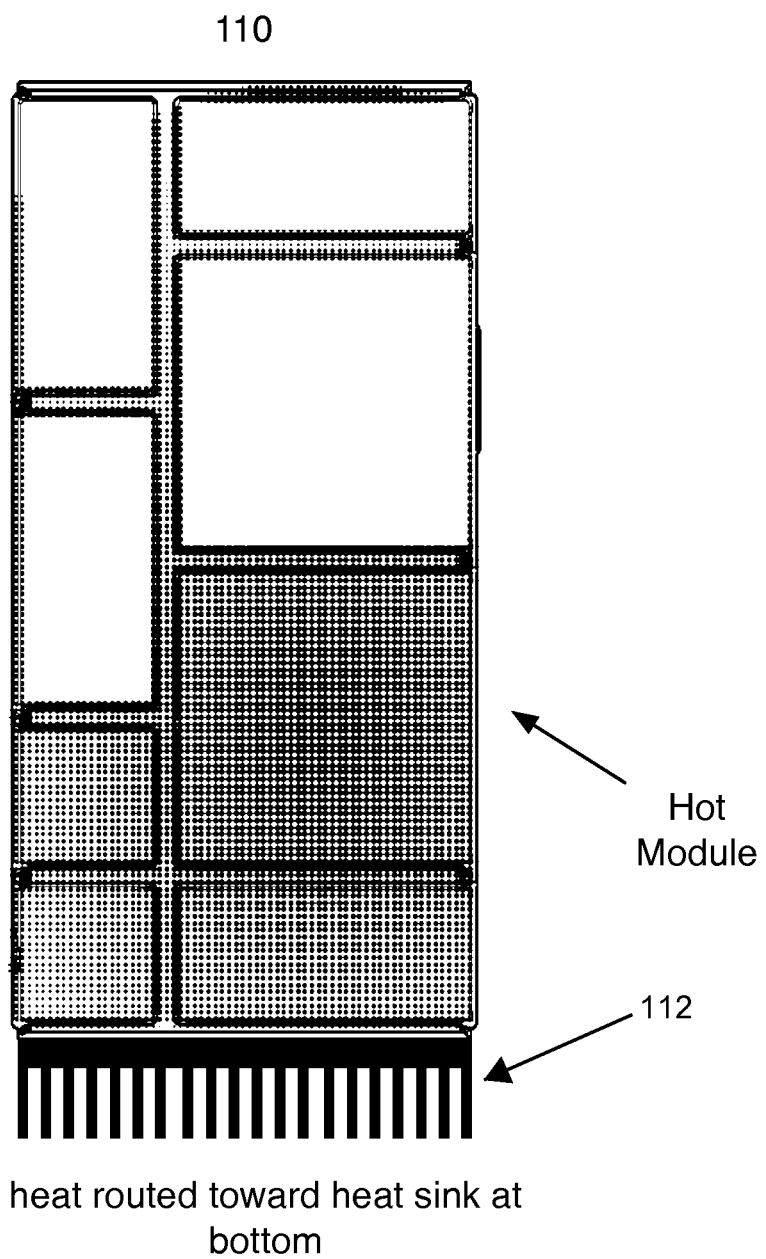
FIG. 6 is an example view of thermal routing of an active heat routing system of a system of a preferred embodiment.

In one variation of the preferred embodiment, the chassis 110 includes an active heat routing system 111. As shown in FIG. 5, the active heat routing system preferably enables heat to be transferred preferentially from at least one location on the chassis 110 to at least one other location on the chassis 110. The active heat routing system may additionally or alternatively function to selectively increase or decrease heat transfer between two locations on the chassis 110. The active heat routing system may be used, for instance, to allow a module especially sensitive to heat to be partially thermally isolated from modules that produce large amounts of heat. As shown in FIG. 6, the active heat routing system may additionally or alternatively be used to transfer heat from a module that produces large amounts of heat to a heat dissipation site on the chassis 110, allowing heat from that module to be dissipated without transferring substantially to surrounding modules. The active heat routing system is preferably controlled by the thermal controller 130.

The chassis 110 preferably additionally functions to dissipate heat produced by modules and/or the MEDES. The chassis 110 preferably dissipates heat to the air passively via exposed surfaces of the chassis 110. The chassis 110 may additionally include structural features to assist heat transfer to the air; for example, the chassis 110 may include heat sink fins designed to dissipate module heat to the air. The chassis 110 may additionally or alternatively incorporate active heat transfer elements and/or systems to aid heat dissipation to the air (e.g., a fan, a thermoelectric device, etc.). Active heat transfer elements are preferably controlled by the thermal controller 130.

In one variation of the preferred embodiment, the system 100 includes a removable heat dissipater 112. The removable heat dissipater 112 preferably couples to the chassis 110 in the same manner as a module, but may additionally or alternatively removably couple to the chassis 110 in any way. For example, the removable heat dissipater 112 may be a heatsink/fan combination that thermally couples to the chassis 110 and electrically couples to the module power network of the MEDES through a module interface. As another example, the removable heat dissipator may be a passive heatsink that clips onto an edge of the chassis 110.

The thermal sensors 120 function to provide temperature measurements at locations of the CCMMED. The thermal sensors 120 are preferably integrated into the chassis 110, but may additionally or alternatively be integrated into the MEDES, into the modules, and/or in any other suitable location. The thermal sensors 120 preferably communicate temperature data to the thermal controller 130, but may additionally or alternatively communicate temperature data to any other suitable recipient. Temperature data may include temperature readings, data convertible to temperature readings (e.g. the voltage across a thermocouple), or any other suitable temperature data. The thermal sensors 120 may be thermistors, resistance temperature detectors (RTDs), thermocouples, silicon bandgap temperature sensors, infrared sensors, or any other suitable thermal sensors. If the system 100 includes thermoelectric devices, those devices may additionally or alternatively be used to measure temperature differences across their junctions using the Seebeck effect.

In particular, the thermal sensors 120 may include printed circuit board trace RTD sensors. PCB trace RTD sensors preferably measure temperature based on the changing resistance of a trace of a printed circuit board (PCB). This allows the thermal sensors 120 to be integrated into other components. The PCB trace RTD sensors are preferably integrated into circuit boards of the MEDES, but may additionally or alternatively be integrated into any suitable circuit board, including circuit boards purpose built for thermal sensing.

The thermal controller 130 functions to monitor, control, and/or manage temperature of and/or heat transfer through the CCMMED. The thermal controller 130 is preferably part of a supervisory controller of the MEDES, but may additionally or alternatively be contained within one or more modules, be an ASIC integrated into the MEDES or the chassis no, or interface with the CCMMED in any other suitable way. The thermal controller 130 preferably includes a microprocessor or microcontroller, and storage (e.g. flash memory, EEPROM).

The thermal controller 130 preferably monitors temperature of and/or heat transfer through the CCMMED using the thermal sensors 120, but may additionally or alternatively monitor temperature of and/or heat transfer through the CCMMED using thermal sensors in the modules or using any other suitable thermal sensors. The thermal controller 130 may additionally or alternatively estimate temperature and/or heat transfer characteristics using thermal models of modules, the MEDES, and/or the chassis 110 and input variables (such as a module's current draw).

Thermal models of the modules, the MEDES, and/or the chassis 110 preferably take into account operating state, power data, time, context, and other relevant variables and can be used to predict thermal characteristics and/or temperature based on these variables. Operating state of the modules preferably includes module power state and module usage; operating state of the MEDES preferably includes MEDES power state and MEDES usage; operating state of the chassis 110 preferably includes power state of any active heat routing or heat dissipation systems. Power data preferably includes whether modules or the MEDES are producing, releasing, storing, and/or consuming power and associated power characteristics (current, voltage, etc.). Context preferably includes the thermal models and/or states of the surrounding environment (e.g. context for one module might be the operating state and temperatures of surrounding modules and local areas of the chassis 110). Thermal models may be formed using information from any suitable source, including module manufacturer information and information derived from field use data (which may be crowdsourced from various users with varying configuration instances of mobile electronic devices). Thermal models are preferably dynamic and may be altered by new information at any time, but may alternatively be static. Thermal models of components of the CCMMED are preferably combined into a system-level thermal model based on the individual thermal models. The system-level thermal model preferably can predict the thermal characteristics of the CCMMED based on time, context, state, and other suitable variables.

In one variation of the preferred embodiment, thermal models are generated based in part on the power models of U.S. Provisional Application No. 61/976,205, which is incorporated in its entirety by this reference.

The thermal controller 130 preferably controls temperature of and/or heat transfer through the CCMMED through power management of the modules and the MEDES, through control of active heat routing/transfer systems, and through directed user intervention. The thermal controller 130 may additionally or alternatively control temperature of and/or heat transfer through the CCMMED in any suitable manner.

The thermal controller 130 preferably controls temperature of and/or heat transfer through the CCMMED in response to thermal data measured by the thermal sensors 120, but may additionally or alternatively control temperature of and/or heat transfer through the CCMMED in response to thermal model estimates or in response to any other appropriate data or stimuli.

The thermal controller 130 preferably includes a heat transfer algorithm that directs control of CCMMED temperature/heat transfer. The heat transfer algorithm preferably includes heat transfer or temperature goals and directs control to achieve those goals. Some example heat transfer goals might include increasing heat dissipation from the chassis 110 to air, preventing temperature at a location of the chassis 110 from rising above a temperature threshold, and/or decreasing temperature gradient across the chassis 110. Heat transfer goals might additionally be linked to power management goals; for example, active thermal control (e.g. running a fan) might only be used if the total remaining battery capacity of the CCMMED is above some battery threshold. As another example, thermal goals may be based on power goals; for example, if it is known that a processor module consumes 5 W at 5 deg. Celsius above ambient temperature and 6 W at 15 deg. Celsius above ambient temperature, and that it takes 500 mW to maintain the processor module temperature at 5 deg. Celsius above ambient temperature, the thermal controller 120 may attempt to maintain the processor module at 5 deg. Celsius above ambient to save power. Heat transfer goals may also additionally be linked to performance goals; for example, if it is known that a processor module performs ten percent better in benchmarks at 5 deg. Celsius above ambient than it does at 15 deg. Celsius above ambient, the thermal controller 120 may attempt to maintain the processor module at 5 deg. Celsius above ambient in situations where processor performance is important (for user experience or otherwise).

The heat transfer algorithm is preferably stored in the storage of the thermal controller 130, but may additionally or alternatively be stored in any suitable location. The heat transfer algorithm is preferably modifiable by the thermal controller 130, by modules, or by any other suitable modifying entity. Heat transfer algorithm goals and control steps may be derived from thermal models or any other suitable source of information.

The thermal controller 130 preferably controls temperature of and/or heat transfer through the CCMMED through power management of the modules and the MEDES. Specifically, reducing the power used by a module or the MEDES is often an effective way to reduce temperature. The thermal controller 130 preferably works with a power controller of the CCMMED to achieve both power and thermal goals, while not overly sacrificing user experience or device performance. Some examples of power controller and thermal controller 130 cooperation include those mentioned in the section on the heat transfer algorithm of the thermal controller 130. The thermal controller 130 preferably allows the power controller to manage power usage of modules and/or the MEDES except in situations where the management of the power controller would cause damage or induce reliability issues to modules or the MEDES (for instance, in the case of a module overheating). Additionally or alternatively, the thermal controller 130 may override the power controller at any time and for any reason. Overriding the power controller may include directing the power controller to direct a module or the MEDES to adopt a particular power state; additionally or alternatively, overriding the power controller may include directing the power controller to shut off power entirely to a particular module. The thermal controller 130 preferably stores historical and contextual data relating the power states of modules and/or the MEDES to heat transfer characteristics, allowing for precise direction to the power controller. This data may additionally be crowdsourced or provided by module manufacturers. For example, the thermal controller may from historical data know that switching a module from power state P1 to power state P2 for approximately five minutes will allow the module to reach temperature goals. Note that in some situations, power may be reduced to a particular module to protect other modules. For instance, if a module producing large amounts of heat is immediately next to a module that is sensitive to temperature, the former module may be subject to power reduction to protect the latter module. As another example, if a battery module is overheating due to excessive current draw, the thermal controller 130 may attempt to reduce power consumption by all modules drawing power from the battery module. The thermal controller 130 may additionally affect CCMMED operation in other ways; for example, if the chassis 110 is at a high temperature, the thermal controller 130 may direct the CCMMED to utilize one communication method over another to prevent unnecessary heating. As a more specific example, if a Wi-Fi module is known to produce more heat than a 4G LTE module, the thermal controller 130 may direct the use of the 4G LTE module over the Wi-Fi module in high temperature situations.

The thermal controller 130 preferably controls temperature of and/or heat transfer through the CCMMED through control of active heat routing/transfer systems. The thermal controller 130 preferably activates and controls active heat routing and active heat transfer systems when heat dissipation/transfer is needed and power is available to operate these systems. The thermal controller 130 preferably controls active heat routing and active heat transfer systems to meet heat transfer goals of the heat transfer algorithm. As previously mentioned, active heat routing and active heat transfer systems may also be controlled based on the power state of the CCMMED (e.g. they may be deactivated when power is low). For example, if a module is producing large amounts of heat, the thermal controller 130 may activate a heat pump between the module and a heat dissipation site on the chassis 110. In some cases, active heat transfer may include pumping heat to a module. In one example, a module has a light emitter with a temperature-dependent emission frequency; the temperature controller may pump heat away from or toward the module to maintain a particular temperature. In another example, a module has good heat dissipation qualities (e.g. a module with a large heatsink); the thermal controller may pump heat from other modules to that module to more effectively dissipate to air.

Figure 7:
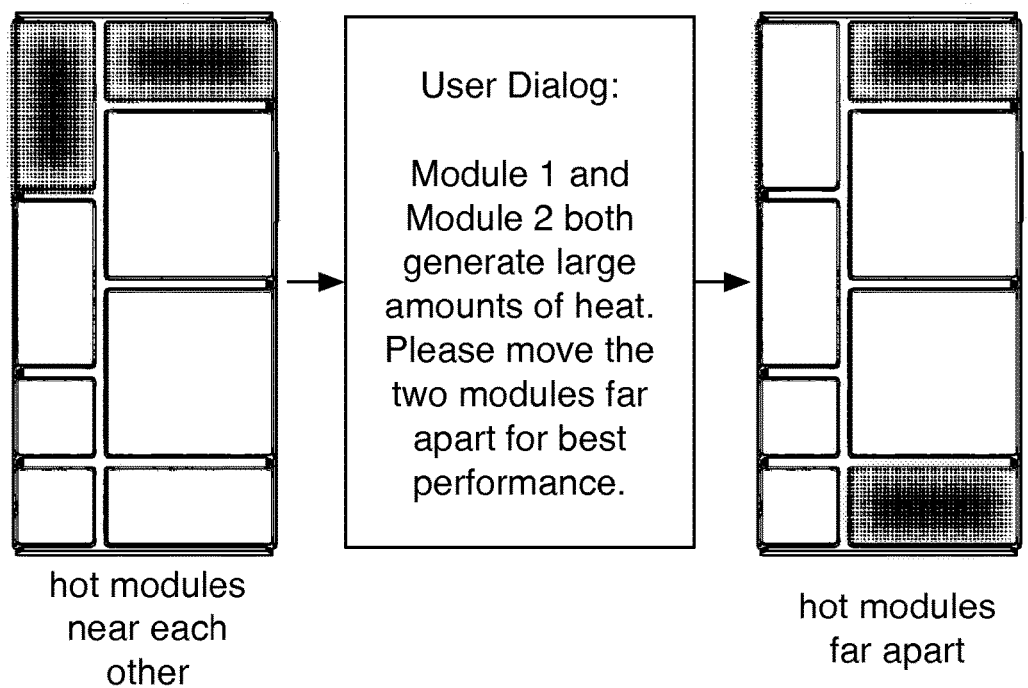
FIG. 7 is an example view of directed user intervention of a thermal controller of a system of a preferred embodiment.

As shown in FIG. 7, the thermal controller 130 preferably controls temperature of and/or heat transfer through the CCMMED through directed user intervention. The user intervention direction may include a screen dialogue display, an audio signal (e.g., series of beeps, or voice announcement), a positioning warning light on the module chassis, or elsewhere. The thermal controller 130 preferably achieves directed user intervention by directing a user to change a configuration or use pattern of the CCMMED. For example, if a module that produces a lot of heat is directly next to a module that is especially sensitive to heat the thermal controller 130 may, through a user interface of the CCMMED (e.g. a display), direct the user to move the modules away from each other. As another example, if two modules both produce a lot of heat the thermal controller 130 may, through a user interface of the CCMMED, direct the user to move the modules away from each other to reduce the thermal gradient across the CCMMED. As a third example, if the thermal controller 130 detects that a particular module generates more heat than other similar modules, the thermal controller 130 may suggest to the user the use of a different module. As a fourth example, if the thermal controller 130 detects that the user is using a case that hinders heat dissipation (e.g., via a proximity sensor, or via detection of reduced heat dissipation characteristics), the thermal controller 130 may suggest that the user remove or replace the case. As a fifth example, if the thermal controller 130 detects that the CCMMED is being used for an activity that generates large amounts of heat (e.g. gaming), the thermal controller 130 may suggest the insertion of a removable heat dissipater 112 or other module that aids in reducing heat production and/or increasing heat dissipation.

2. Methods for Thermal Management

Figure 8:
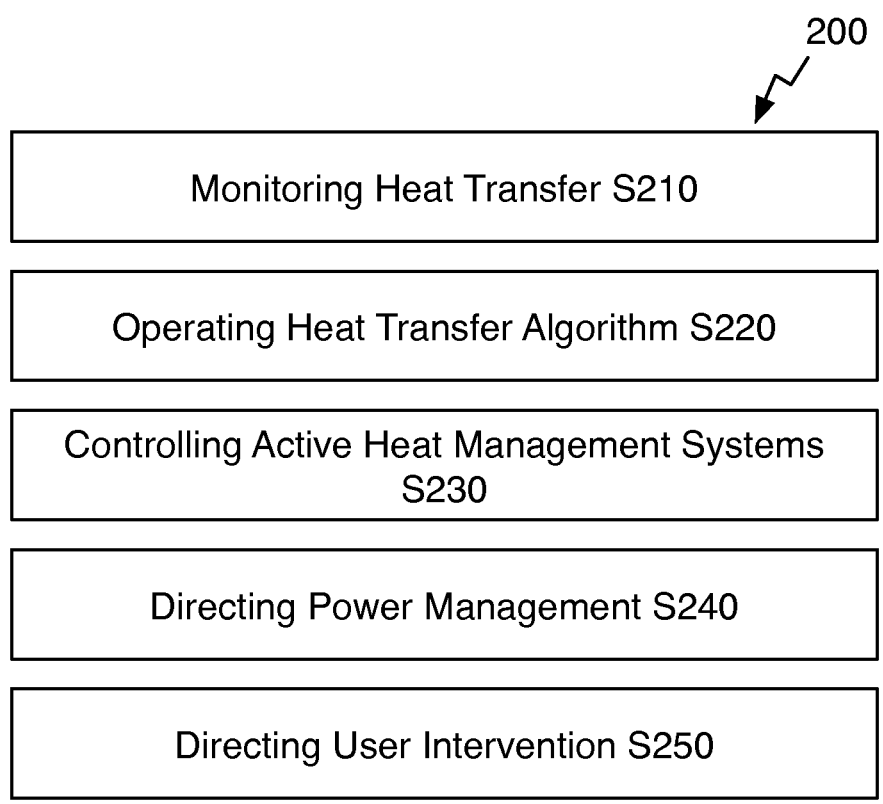
FIG. 8 is a chart view of a method of a preferred embodiment.

As shown in FIG. 8, a method 200 of thermal management of a chassis-coupled modular mobile electronic device (CCMMED) includes monitoring heat transfer S210, operating a heat transfer algorithm S220, controlling active heat management systems S230, directing power management S240, and directing user intervention S250. In a variation of the preferred embodiment, the method 200 may include only one or only two of steps S230, S240, and S250.

The method 200 functions to provide thermal management for a CCMMED. Thermal management is of importance for all mobile electronic devices: mobile electronic devices must effectively deal with the heat that they produce in order to ensure reliability and prevent device failure. Thermal management is even more important for modular mobile electronic devices because heat production and heat dissipation may depend greatly on the configuration of the modular mobile electronic devices. This dependence means that thermal management systems for modular mobile electronic devices may be effective at dissipating heat and controlling heat production for a wide variety of modular mobile electronic device configurations.

The method 200 is preferably implemented by the system 100, but may additionally or alternatively be implemented by any suitable thermal management system.

Step S210 includes monitoring heat transfer. Step S210 functions to identify locations where heat transfer should occur (e.g. areas of high temperature, two locations with a large heat gradient in between). Temperature and/or heat transfer are preferably monitored using thermal sensors of the CCMMED (more preferably the thermal sensors 120 of the system 100), but may additionally or alternatively be monitored using any suitable systems. Monitoring heat transfer preferably includes receiving temperature data; temperature data may include temperature readings, data convertible to temperature readings, or any suitable temperature data. Step 210 may additionally or alternatively include estimating temperature and/or heat transfer characteristics using thermal models of modules of the CCMMED, a MEDES of the CCMMED, and/or a chassis of the CCMMED and input variables (such as a module's current draw). The thermal models of Step S210 are preferably substantially similar to those of the system 100, but may additionally or alternatively be any suitable thermal models.

Step S220 includes operating a heat transfer algorithm. The heat transfer algorithm preferably functions to direct control of CCMMED temperature/heat transfer. The heat transfer algorithm preferably includes heat transfer or temperature goals and directs control to achieve those goals. Some example heat transfer goals might include increasing heat dissipation from the chassis to air, preventing temperature at a location of the chassis from rising above a temperature threshold, and/or decreasing temperature gradient across the chassis. Heat transfer goals might additionally be linked to power management goals; for example, active thermal control (e.g. running a fan) might only be used if the total remaining battery capacity of the CCMMED is above some battery threshold. As another example, thermal goals may be based on power goals; for example, if it is known that a processor module consumes 5 W at 5 deg. Celsius above ambient temperature and 6 W at 15 deg. Celsius above ambient temperature, and that it takes 500 mW to maintain the processor module temperature at 5 deg. Celsius above ambient temperature, Step S220 may include attempting to maintain the processor module at 5 deg. Celsius above ambient to save power. Heat transfer goals may also additionally be linked to performance goals; for example, if it is known that a processor module performs ten percent better in benchmarks at 5 deg. Celsius above ambient than it does at 15 deg. Celsius above ambient, Step S220 may include attempting to maintain the processor module at 5 deg. Celsius above ambient in situations where processor performance is important (for user experience or otherwise).

Step S220 may include modifying the heat transfer algorithm based on module input, MEDES input, and/or any other suitable input. Heat transfer algorithm goals and control steps may be derived from thermal models or any other suitable source of information.

The heat transfer algorithm of Step S220 preferably operates on thermal data measured by thermal sensors, but may additionally or alternatively control temperature of and/or heat transfer through the CCMMED in response to thermal model estimates or in response to any other appropriate data or stimuli.

Step S230 includes controlling active heat management systems. Step S230 preferably includes activating and controlling active heat routing and active heat transfer systems (such as those of the system 100) when heat dissipation/transfer is needed and power is available to operate these systems. Step S230 preferably includes controlling active heat routing and active heat transfer systems to meet heat transfer goals of the heat transfer algorithm. As previously mentioned, active heat routing and active heat transfer systems may also be controlled based on the power state of the CCMMED (e.g. they may be deactivated when power is low). For example, if a module is producing large amounts of heat, Step S230 may include activating a heat pump between the module and a heat dissipation site on the chassis. In some cases, active heat transfer may include pumping heat to a module. In one example, a module has a light emitter with a temperature-dependent emission frequency; Step S230 may include pumping heat away from or toward the module to maintain a particular temperature. In another example, a module has good heat dissipation qualities (e.g. a module with a large heatsink); Step S230 may include pumping heat from other modules to that module to more effectively dissipate to air.

Step S240 includes directing power management. Step S240 preferably includes controlling temperature of and/or heat transfer through the CCMMED through power management of the modules and the MEDES. Specifically, reducing the power used by a module or the MEDES is often an effective way to reduce temperature. Step S240 preferably includes cooperating with a power controller of the CCMMED to achieve both power and thermal goals, while not overly sacrificing user experience or device performance. Some examples of power controller cooperation include those mentioned in the section on the heat transfer algorithm of Step S220. Step S240 preferably includes allowing the power controller to manage power usage of modules and/or the MEDES except in situations where the management of the power controller would cause damage or induce reliability issues to modules or the MEDES (for instance, in the case of a module overheating). Additionally or alternatively, Step S240 may include overriding the power controller at any time and for any reason. Overriding the power controller may include directing the power controller to direct a module or the MEDES to adopt a particular power state; additionally or alternatively, overriding the power controller may include directing the power controller to shut off power entirely to a particular module. Step 240 may additionally include storing historical and contextual data relating the power states of modules and/or the MEDES to heat transfer characteristics, allowing for precise direction to the power controller. This data may additionally be crowd-sourced or provided by module manufacturers. For example, historical data may indicate that switching a module from power state P1 to power state P2 for approximately five minutes will allow the module to reach temperature goals. Note that in some situations, power may be reduced to a particular module to protect other modules. For instance, if a module producing large amounts of heat is immediately next to a module that is sensitive to temperature, the former module may be subject to power reduction to protect the latter module. As another example, if a battery module is overheating due to excessive current draw, Step S240 may include attempting to reduce power consumption by all modules drawing power from the battery module. Step S240 may additionally affect CCMMED operation in other ways; for example, if the chassis is at a high temperature, Step S240 may include directing the CCMMED to utilize one communication method over another to prevent unnecessary heating. As a more specific example, if a Wi-Fi module is known to produce more heat than a 4G LTE module, the CCMMED may be directed the to use the 4G LTE module over the Wi-Fi module in high temperature situations.

Step S250 includes directing user intervention. Step S250 preferably directs user intervention by directing a user to change a configuration or use pattern of the CCMMED. For example, if a module that produces a lot of heat is directly next to a module that is especially sensitive to heat, Step S250 may include directing the user to move the modules away from each other. As another example, if two modules both produce a lot of heat, Step S250 may include directing the user to move the modules away from each other to reduce the thermal gradient across the CCMMED. As a third example, if it is detected that a particular module generates more heat than other similar modules, Step S250 may include suggesting to the user the use of a different module. As a fourth example, if it is detected that the user is using a case that hinders heat dissipation (e.g., via a proximity sensor, or via detection of reduced heat dissipation characteristics), Step S250 may include suggesting that the user remove or replace the case. As a fifth example, if it is detected that the CCMMED is being used for an activity that generates large amounts of heat (e.g. gaming), Step S250 may include suggesting the insertion of a removable heat dissipater or other module that aids in reducing heat production and/or increasing heat dissipation.

3. Thermal Management

Figure 9:
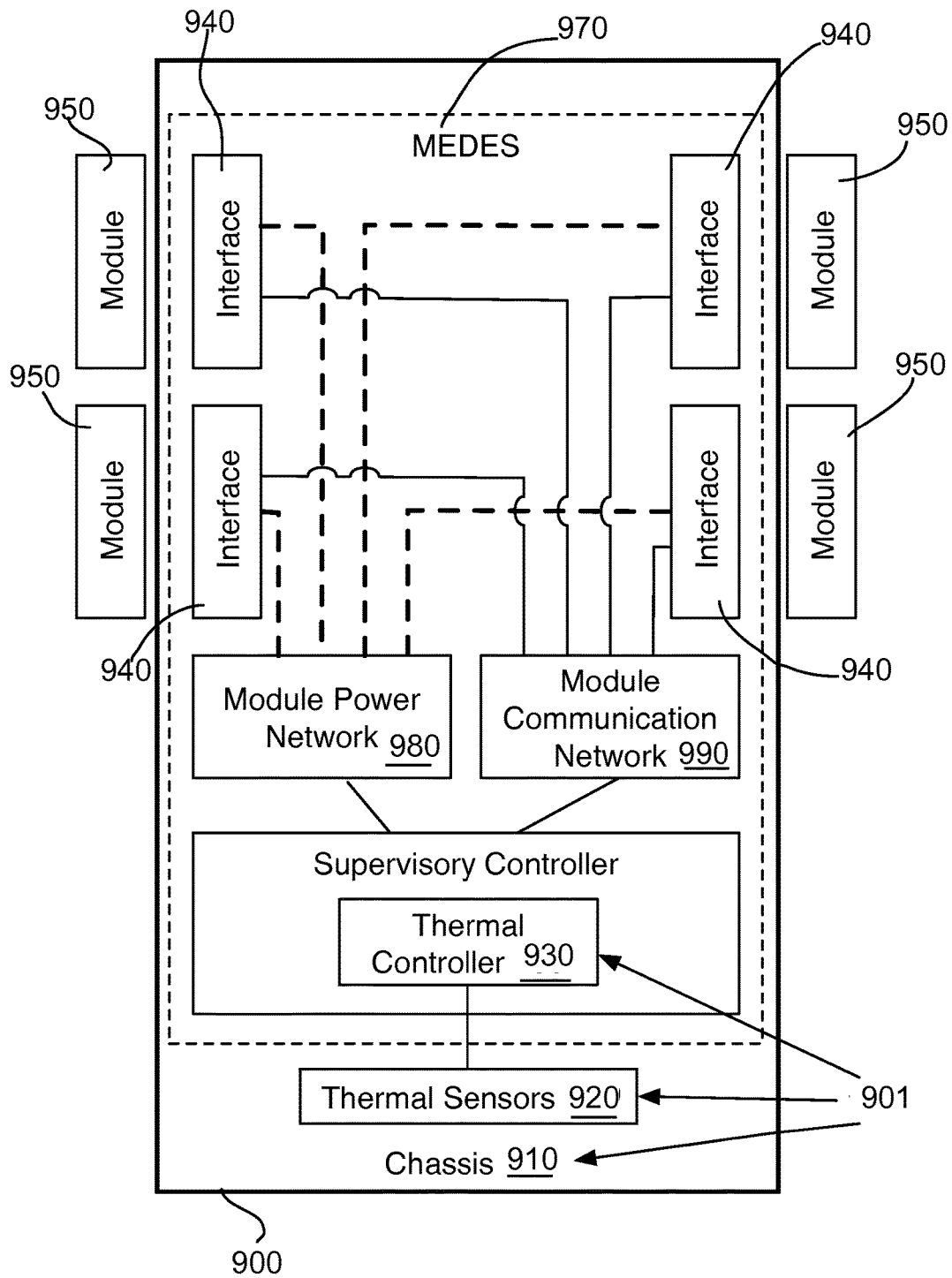
FIG. 9 is a diagram view of a modular mobile electronic device of a preferred embodiment.

As shown in FIG. 9, a modular mobile electronic device 900 includes a thermal management system 901. The thermal management system 901 includes a chassis 910, thermal sensors 920, and a thermal controller 930. The electronic device 900 includes a modular electronic device enablement system (hereafter MEDES) 970 coupled to a plurality of modules 950 via respective module interfaces 940. In some embodiments, the thermal management system 901 operates as part of a CCMMED such as the CCMMED of U.S. Provisional Application No. 61/976,195, which is incorporated in its entirety by this reference. In some implementations, the MEDES 970 is substantially similar to the system of U.S. Provisional Application No. 61/976,173, which is incorporated in its entirety by this reference. The thermal management system 901 may additionally or alternatively operate on and/or as part of any suitable CCMMED or similar system.

In some implementations, the MEDES 970 includes a module power network 980, a module communication network 990, and a plurality of module interfaces 940.

In some implementations, the thermal management system 901 is similar to the system 100 of FIG. 1. In some implementations, the MEDES 970 is similar to the MEDES 170 of FIG. 2. In some implementations, the module interfaces 940 are similar to the module interfaces 140 of FIG. 2. In some implementations, the modules 950 are similar to the modules 150 of FIG. 2. In some implementations, the module power network 980 is similar to the module power network 180 of FIG. 2. In some implementations, the module communication network 990 is similar to the module communication network 190 of FIG. 2.

Figure 10:
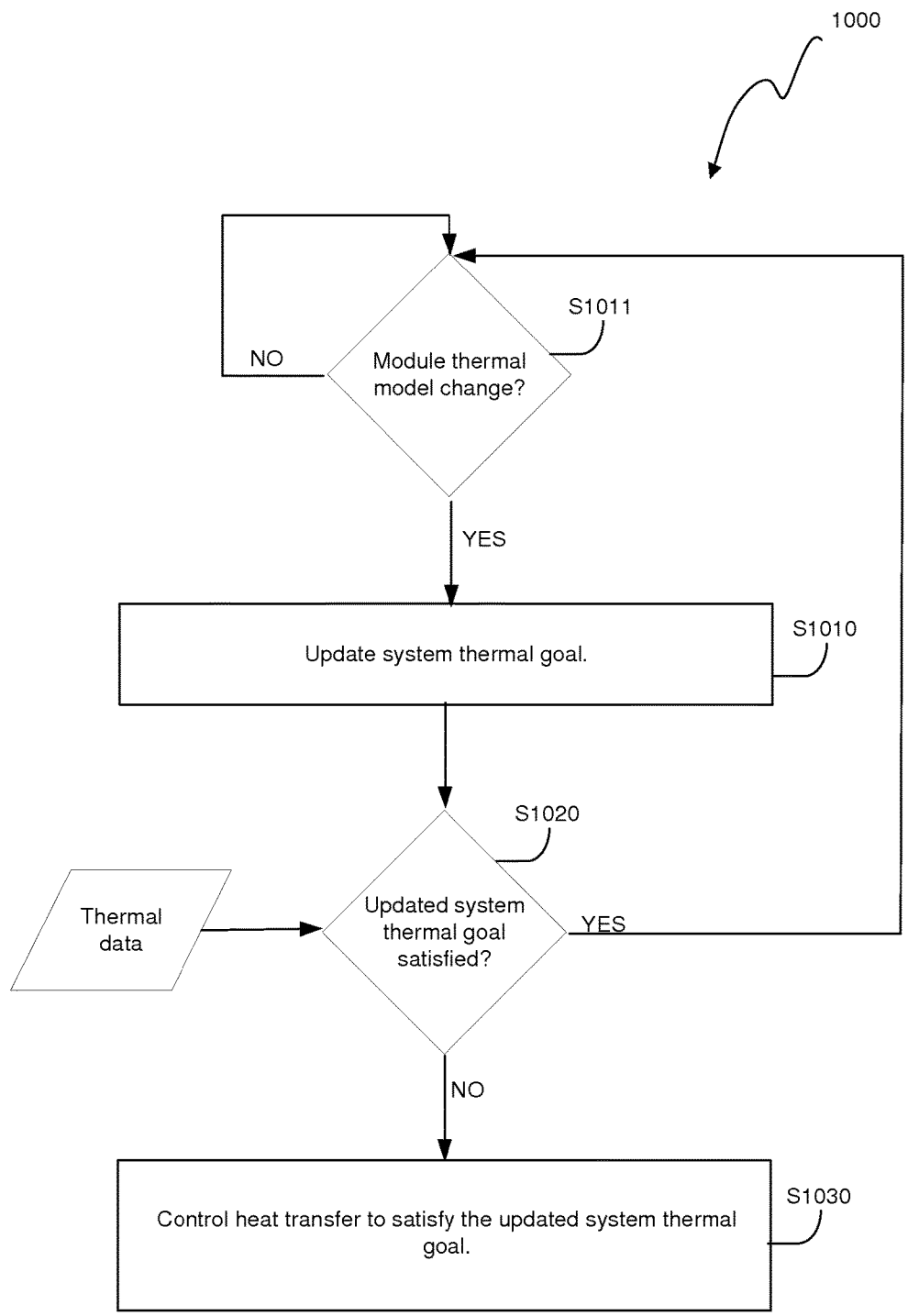
FIG. 10 is a chart view of a method of a preferred embodiment.

As shown in FIG. 10, a method 1000 includes controlling a thermal controller (e.g., the thermal controller 930 of FIG. 9) of a modular mobile electronic device (e.g., the device 900 of FIG. 9) during operation of the electronic device. The electronic device (e.g., 900 of FIG. 9) is coupled to one or more modules (e.g., the modules 950 of FIG. 9) via respective module interfaces (e.g., the interfaces 940 of FIG. 9) of the electronic device. The method 1000 includes: updating at least one system thermal goal based on a change for a module thermal model for at least one module coupled to the electronic device (process S1010); determining whether the updated at least one system thermal goal is satisfied based on thermal data provided by a plurality of thermal sensors arranged at locations associated with the electronic device (process S1020); and responsive to a determination that the updated at least one system thermal goal is not satisfied, controlling heat transfer based to satisfy the updated at least one system thermal goal (process S1030).

In some implementations, the method 900 is implemented by the thermal management system 901, but in some implementations, the method 900 is implemented by any suitable thermal management system.

In some implementations, process S1ow, which includes updating at least one system thermal goal based on a change for a module thermal model for at least one module coupled to the electronic device, functions to update a system thermal goal that corresponds to the module thermal model based on a change for the module thermal model. In some implementations, the at least one system thermal goal is an operating constraint of an associated module, the change to the module thermal model is a change to the operating constraint in the module thermal model, and the thermal controller 930 updates the system thermal goal that corresponds to the module thermal model based on the change to the operating constraint in the module thermal model. In some implementations, operating constraints of modules include at least one of temperature ranges (e.g., "Temp_Range" of Table 1) and maximum temperature changes (e.g., "Max_Temp_Change of Table 1).

In some implementations, the thermal controller 930 determines the at least one system thermal goal based on module thermal goals of the module thermal models stored by the thermal controller 930. In some implementations, determining system thermal goals functions to control the thermal controller to determine goals of module thermal models (e.g., the thermal models of Table 1) stored by the thermal controller 930 (e.g., in a storage device of the thermal controller 930) and generate a system thermal goal for at least one of the determined goals of the module thermal models. In some implementations, the thermal controller 930 generates a system thermal goal for each goal of the module thermal models. In some implementations, the thermal controller 930 generates a system thermal goal for each goal in a subset of goals of the module thermal models. In some implementations, the thermal controller 930 determines the subset of goals by identifying conflicting goals and redundant goals, and resolving conflicting goals and filtering redundant goals. In some implementations, the goals are operating constraints of respective modules.

In some implementations, the module thermal models are provided by each respective module to the thermal controller 930 via the module communication network 990 of the device 900. In some implementations, the thermal controller 930 stores the determined system goals in a storage device of the thermal controller 930.

In some implementations, the thermal controller 930 changes a module thermal module (process S1011 of FIG. 10) for a module (e.g., 950 of FIG. 9) coupled to the device 900 via a module interface (e.g., 940 of FIG. 9). In some implementations, the thermal controller 930 changes a module thermal module for a module in real-time. In some implementations, the thermal controller 930 stores thermal models for the modules coupled to the device 900 in a storage device of the thermal controller 930. In some implementations, the thermal controller 930 stores the thermal models in association with respective locations at which the corresponding modules are arranged on a chassis (e.g., 910 of FIG. 9) of the electronic device 900.

Figure 11:
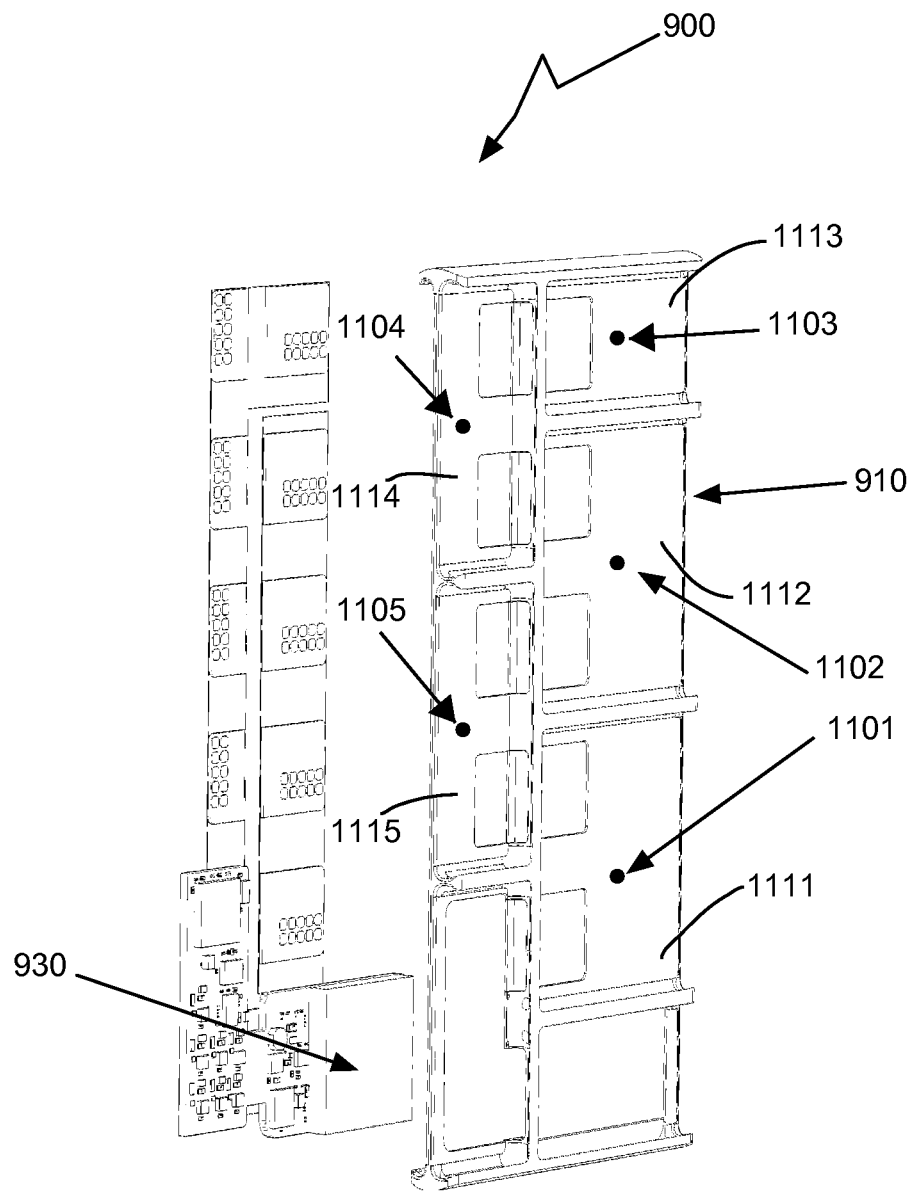
FIG. 11 is a model view of a system of a preferred embodiment.

Table 1 depicts exemplary module thermal model information stored by the thermal controller 930 for Locations 1111-1115 of FIG. 11 and module thermal modules of four (4) modules coupled to the device 900 in an implementation in which the device 900 includes five locations for accepting modules.

TABLE 1

| Location of Chassis 910 | Module Thermal Model |
| --- | --- |
| Location 1111 | {Module ID: "Module 1"; Module_Type: "Processor Module"; Temp_Range: 45-65 deg F.; Max_Temp_Change_Rate: 2 deg F./s} |
| Location 1112 | {Module ID: "Module 2"; Module_Type: "Battery Module"; Temp_Range: 30-100 deg F.; Max_Temp_Change_Rate: 10 deg F./s} |
| Location 1113 | {Module ID: "Module 3"; Module_Type: "Flash Memory Module"; Temp_Range: 15-95 deg F.; Max_Temp_Change_Rate: 15 deg F./s} |
| Location 1114 | {Module ID: "Module 4"; Module_Type: "Touchscreen Module"; Temp_Range: 15-120 deg F.; Max_Temp_Change_Rate: 8 deg F./s} |
| Location 1115 | Unused Module Interface (No module coupled at location 1112) |

In the implementation of FIG. 11, each location 1111-1115 has at least one corresponding module interface (e.g., 940) for coupling with one or more respective modules (e.g., 950). As shown in Table 1, each module thermal model specifies the following: "Module ID", "Module Type", "Temp_Range" (temperature range in degrees Fahrenheit), "Max_Temp_Change" (maximum temperature change rate in degrees Farenheit per second).

In embodiments, each module thermal module (e.g., the module thermal models of Table 1) defines a module thermal goal for the associated module. In an implementation, module thermal goals include at least one of temperature ranges (e.g., "Temp_Range" of Table 1) and maximum temperature changes (e.g., "Max_Temp_Change of Tale 1). In some implementations, the thermal controller 930 determines current temperature and temperature changes associated with a module by using a thermal sensor(s) (e.g., 1101-1105 of FIG. 11) associated with the module. In some implementations, thermal sensors can include at least one of a thermal sensor arranged on the chassis (e.g., 910) of the electronic device 900, a thermal sensor included in a module (e.g., 950 of FIG. 9) coupled to the electronic device 900 via a module interface (e.g., 940) of the electronic device, and a thermal sensor included in an enablement system (e.g., the MEDES 970 of FIG. 9) of the electronic device 900.

In some implementations, the thermal controller 930 changes the module thermal model for a module coupled to the device 900 based on at least one of thermal data provided by the plurality of thermal sensors, operating state, power data, context information and time. In some implementations, the thermal controller changes the thermal model for the at least one module based on at least one of thermal constraints of nearby (or surrounding) modules, thermal constraints of nearby (or surrounding) components of the electronic device, and thermal constraints of at least one local area of a chassis of the electronic device. In some implementations, the thermal controller 930 changes the module thermal model for a module coupled to the device 900 based on at least one of thermal data provided by the plurality of thermal sensors, module information for the module, module information for other modules of the device 900, and system information of the device 900. In some implementations, module information includes at least one of module type, operating state, power data, and context information of a module, and system information includes at least one of operating state, power data, and context information of a MEDES (e.g., 970) of the device 900.

In some implementations, the thermal controller 930 changes the module thermal model for a module coupled to the device 900 based on change in power characteristics (current, voltage, etc.) of at least one of the module and the module power network 980.

As an example, the thermal controller 930 can change the operating temperature range specified in a thermal model of a processor module based on change in at least one of current and voltage supplied to the processor module by the module power network 980 (the change in at least one of current and voltage supplied to the processor module by the module power network 980 being communicated to the thermal controller 930 by the module power network 980).

As an example, the thermal controller 930 can change the operating temperature range specified in a thermal model of a touchscreen module based on an operating temperature range specified in a thermal model of a module newly coupled to the device 900 and arranged at a location (e.g., 1115) adjacent to a location (e.g., 1114) at which the touchscreen module is arranged on the chassis 910 of the electronic device 900 (the operating temperature range of the newly coupled module being communicated to the thermal controller 930, for example, by the module communication network 990).

As an example, the thermal controller 930 can change the operating temperature range specified in a thermal model of a touchscreen module based on a change in operating state of a module arranged at a location (e.g., 1115) adjacent to a location (e.g., 1114) at which the touchscreen module is arranged on the chassis 910 of the electronic device 900 (the change in operating state being communicated to the thermal controller 930, for example, by one of the module communication network 990 and the module power network 980).

As an example, the thermal controller 930 can change the operating temperature range specified in a thermal model of a touchscreen module based on a change in temperature (e.g., sensed by, e.g., the sensor 1105) at a location (e.g., 1115) adjacent to a location (e.g., 1114) at which the touchscreen module is arranged on the chassis 910 of the electronic device 900. In this manner, the thermal controller can change the operating temperature range of the touchscreen module to reduce heat produced by the touchscreen module responsive to a determination that a temperature of a location near a location of the touchscreen module has increased (e.g., above a predetermined amount, above a predetermined rate, etc.). For example, if the thermal controller 930 determines that a temperature at a location of a nearby module is approaching an upper bound of a maximum temperature range specified in the model of the nearby module, the thermal controller 930 can change the thermal model of the touchscreen module by lowering the maximum temperature range of the touchscreen module's model to reduce further temperature increase at the location of the nearby module. By virtue of changing a thermal model of a module responsive to thermal data at locations of other modules, the thermal controller 930 can control heat generation and heat transfer of the electronic device 900 to provide more efficient operation of the device 900 with respect to the operating constraints of individual modules coupled to the device.

In some implementations, process S1020, which includes determining whether the updated at least one system thermal goal is satisfied based on thermal data provided by a plurality of thermal sensors arranged at locations associated with the electronic device, functions to control the thermal controller 930 to compare the thermal data to the at least one system thermal goal to determine whether the goal is satisfied.

As described above, in some implementations, the system thermal goals include operating constraints of respective modules coupled to the device 900. In some implementations, the thermal controller 930 compares the thermal data to the operating constraints to determine whether the operating constraints are satisfied. In some implementations, the thermal controller 930 determines whether the updated at least one system thermal goal is satisfied by determining whether an associated module thermal goal (e.g., operating constraint) is satisfied based on at least one of thermal data of the module, thermal data associated with at least one nearby (or surrounding) module, and thermal data associated with at least one local area (e.g., one of 1111-1115) of the chassis 910 of the electronic device 900. In some implementations, the thermal controller 930 determines whether a module thermal goal (e.g., operating constraint) is satisfied based on at least one of thermal data of the module, thermal data associated with at least one nearby (or surrounding) module, thermal data associated with at least one local area (e.g., one of 1111-1115) of the chassis 910 of the electronic device 900, operating state of the module (e.g., provided by the module communication network 990), operating state of nearby (or surrounding) modules (e.g., provided by the module power network 990), power data of the module (e.g., provided by the module power network 980), power data of nearby (or surrounding) modules (e.g., provided by the module power network 980), context information of the module, and context information of nearby (or surrounding) modules.

In some implementations, thermal data includes at least one of a current temperature and a temperature change within at least one predetermined period (e.g., last thermal data sample of a thermal sensor, 1 second, 1 minute, etc.).

In some implementations, thermal sensors arranged at locations associated with the electronic device 900 include at least one of a thermal sensor arranged at a location (e.g., 1111-1115 of FIG. 11) on the chassis (e.g., 910) of the electronic device 900, a thermal sensor included in a module (e.g., 950 of FIG. 9) coupled to the electronic device 900 via a module interface (e.g., 940) of the electronic device, and a thermal sensor included in an enablement system (e.g., the MEDES 970 of FIG. 9) of the electronic device 900.

In some implementations, process S1030, which includes controlling heat transfer to satisfy the updated at least one thermal goal responsive to a determination that the updated at least one system thermal goal is not satisfied, functions to: control the thermal controller 930 to control heat transfer within the electronic device 900.

In some implementations, the thermal controller 930 controls heat transfer by controlling power management of the modules (e.g., the modules 950) coupled to the electronic device 900 by using at least one of the module power network 980 and the module communication network 990.

In some implementations, the thermal controller 930 controls heat transfer by controlling at least one active heat management system of the electronic device to perform at least one of: routing heat towards a location of the electronic device; selectively increasing heat transfer between two locations on a chassis of the electronic device; selectively decreasing heat transfer between two locations on the chassis; and thermally isolating a module.

In some implementations, the thermal controller 930 controls heat transfer by controlling a display module (e.g., a module 950) coupled to the electronic device 900 to display information to direct user intervention.

In some implementations, the thermal controller 930 controls heat transfer by controlling an audio module (e.g., a module 950) coupled to the electronic device 900 to emit an audible signal (e.g., series of beeps, or voice announcement) to direct user intervention.

In some implementations, the thermal controller 930 controls heat transfer by controlling a positioning warning light on the module chassis 910, or elsewhere, to direct user intervention.

In some embodiments, the thermal controller 930 achieves directed user intervention by directing a user to change a configuration or use pattern of the electronic device 900. For example, if a module that produces a lot of heat is directly next to a module that is especially sensitive to heat the thermal controller 930 may, through a user interface of the electronic device 900 (e.g. a display), direct the user to move the modules away from each other. As another example, if two modules both produce a lot of heat the thermal controller 930 may, through a user interface of the electronic device 900, direct the user to move the modules away from each other to reduce the thermal gradient across the electronic device 900. As a third example, if the thermal controller 930 detects that a particular module generates more heat than other similar modules, the thermal controller 930 may suggest to the user the use of a different module. As a fourth example, if the thermal controller 930 detects that the user is using a case that hinders heat dissipation (e.g., via a proximity sensor, or via detection of reduced heat dissipation characteristics), the thermal controller 930 may suggest that the user remove or replace the case. As a fifth example, if the thermal controller 930 detects that the electronic device 900 is being used for an activity that generates large amounts of heat (e.g. gaming), the thermal controller 930 may suggest the insertion of a removable heat dissipater or other module that aids in reducing heat production and/or increasing heat dissipation.

As shown in FIG. 11, the chassis 910 includes a plurality of thermal sensors 1101-1105 arranged at various locations 1111-1105 of the chassis 910. In some implementations, the sensors 1101-11015 are similar to the sensors 120 of FIG. 1 and 920 of FIG. 9.

An alternative embodiment preferably implements the above methods in a computer-readable medium storing computer-readable instructions. The instructions are preferably executed by computer-executable components preferably integrated with a system consisting of a plurality of modules and a module power controller. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method comprising: during operation of an electronic device that is coupled to one or more modules via respective module interfaces of the electronic device, using a thermal controller of the electronic device to:
update one or more system thermal goals based on a change for a module thermal model for at least one module coupled to the electronic device, wherein the one or more system thermal goals comprise a decreasing temperature gradient across a chassis of the electronic device
determine whether the one or more system thermal goals are satisfied based on thermal data provided by a plurality of thermal sensors arranged at locations associated with the electronic device; and
responsive to a determination that the one or more system thermal goals are not satisfied, control heat transfer to satisfy the one or more system thermal goals, wherein the controlling heat transfer comprises controlling a display of the electronic device to generate one or more directions to change a layout configuration of the one or more modules to satisfy the one or more system thermal goals.

2. The method of claim 1, wherein the one or more system thermal goals correspond to the module thermal model.

3. The method of claim 2, wherein the one or more system thermal goals are an operating constraint of an associated module,
wherein the change to the module thermal model is a change to the operating constraint in the module thermal model, and
wherein the thermal controller updates the one or more system thermal goals that correspond to the module thermal model based on the change to the operating constraint in the module thermal model.

4. The method of claim 3, wherein the operating constraints of the one or more modules include at least one of temperature ranges and maximum temperature changes.

5. The method of claim 1, wherein the thermal controller determines the one or more system thermal goals based on module thermal goals of module thermal models stored by the thermal controller.

6. The method of claim 5, wherein the thermal controller determines goals of module thermal models stored by the thermal controller and generates one of the one or more system thermal goals for at least one of the determined goals of the module thermal models.

7. The method of claim 6,
wherein the thermal controller generates a system thermal goal for each goal in a subset of goals of the module thermal models, and
wherein the thermal controller determines the subset of goals by: identifying conflicting goals and redundant goals; and resolving conflicting goals and filtering redundant goals, and
wherein the one or more system thermal goals include operating constraints of respective modules.

8. The method of claim 1,
wherein the thermal controller stores thermal models for the one or more modules coupled to the electronic device in a storage device of the thermal controller, and
wherein the thermal controller stores thermal models in association with respective locations at which corresponding modules are arranged on the chassis of the electronic device.

9. The method of claim 8,
further comprising: during operation of the electronic device, using the thermal controller to change the module thermal model for the at least one module.

10. The method of claim 9,
wherein the thermal controller changes the module thermal model based on at least one of:
thermal constraints of nearby modules;
thermal constraints of nearby components of the electronic device; and
thermal constraints of at least one local area of the chassis of the electronic device.

11. The method of claim 9,
wherein the thermal controller changes the module thermal model based on at least one of thermal data provided by the plurality of thermal sensors, module information for the at least one module, module information for other modules of the electronic device, and system information of the electronic device,
wherein module information includes at least one of module type, operating state, power data, and context information of a module, and
wherein system information includes at least one of operating state, power data, and context information of a modular electronic device enablement system of the electronic device.

12. The method of claim 9, wherein the thermal controller changes the module thermal model based on change in power characteristics of at least one of the at least one module and a module power network of the electronic device.

13. The method of claim 1, wherein thermal data includes at least one of; a temperature; and a temperature change within a predetermined period.

14. The method of claim 1, wherein the plurality of thermal sensors include at least one of a thermal sensor arranged at a location on the chassis of the electronic device, a thermal sensor included in a module coupled to the electronic device via a module interface of the electronic device, and a thermal sensor included in an enablement system of the electronic device.

15. The method of claim 1, wherein the thermal controller determines that the one Of more system thermal goals that have been updated are satisfied based on at least one of:
thermal data of a first module corresponding to the one or more system thermal goals;
thermal data associated with at least one module located near the first module;
thermal data associated with at least one local area of the chassis of the electronic device;
operating state of the first module;
operating state of modules near the first module;
power data of the first module;
power data of modules near the first module;
context information of the first module; and
context information of modules near the first module.

16. The method of claim 1, wherein the controlling heat transfer comprises: controlling a display of the electronic device to display information to direct a user to move two or more of the one or more modules farther apart to satisfy the one or more system thermal goals that have been updated.

17. The method of claim 1, wherein the controlling heat transfer comprises: controlling at least one active heat management system of the electronic device to perform at least one of:
routing heat towards a location of the electronic device;
selectively increasing heat transfer between two locations on the chassis of the electronic device;
selectively decreasing heat transfer between two locations on the chassis; and
thermally isolating a module.

18. An electronic device system comprising:
a chassis;
a plurality of thermal sensors arranged at locations associated with the system;
a plurality of module interfaces, each module interface constructed to removably couple a module to the system;
a module power network (MPN) constructed to provide power transfer between modules coupled to the system via respective ones of the plurality of module interfaces;
a module communication network (MCN) constructed to enable data transfer between modules coupled to the system via respective module interfaces;
a thermal controller coupled to the module power network, the thermal controller constructed to, during operation of the system;
update one or more system thermal goals based on ,a change for a module thermal model for at least one module coupled to the electronic device, wherein the one or more system thermal goals comprise a decreasing temperature gradient across the chassis of the electronic device;
determine whether the one or more system thermal goals are satisfied based on thermal data provided by a plurality of thermal sensors arranged at locations associated with the electronic device; and
responsive to a determination that the one or more system thermal goals are not satisfied, control heat transfer to satisfy the one or more system thermal goals, wherein the controlling heat transfer comprises controlling a display of the electronic device to generate one or more directions to change a layout configuration of the one or more modules to satisfy the one or more system thermal goals.

19. The system of claim 18,
wherein the thermal controller stores thermal models for modules coupled to the system in a storage device of the system,
wherein the thermal controller stores thermal models in association with respective locations at which corresponding modules are arranged on the chassis,
wherein the thermal controller changes the module thermal model of the at least one module based on at least one of: thermal constraints of nearby modules; thermal constraints of nearby components of the system; thermal constraints of at least one local area of the chassis; thermal data provided by the plurality of thermal sensors; module information for the at least one module; module information for other modules coupled to the system; system information of the system; and change in power characteristics of at least one of the at least one module and the module power network, and
wherein the thermal controller determines whether the updated at least one system thermal goal is satisfied based on at least one of thermal data of a first module corresponding to the at least one system thermal goal; thermal data associated with at least one module near the first module; thermal data associated with at least one local area of the chassis; operating state of modules near the first module; power data of the first module; power data of modules near the first module; context information of the first module; and context information of modules near the first module.

20. The system of claim 18, wherein the one or more directions comprise moving the one or more modules to reduce a. thermal gradient of the electronic device, increasing the distance between at least two of the one or more modules, replacing at least one of the one or more modules, removing or replacing a chassis of the electronic device, or inserting a heat dissipater into a chassis of the electronic device.

* * * * *